United States Patent [19]

Horowitz

[11] 4,019,525
[45] Apr. 26, 1977

[54] TRACTOR PROTECTION VALVE

[75] Inventor: Charles Horowitz, Niles, Ill.

[73] Assignee: Sloan Valve Company, Franklin Park, Ill.

[22] Filed: Jan. 22, 1976

[21] Appl. No.: 651,410

[52] U.S. Cl. .................................. 137/107; 137/87; 137/512; 303/28

[51] Int. Cl.² ........................................ G05D 7/00

[58] Field of Search ............ 137/87, 102, 107, 512; 303/28, 29, 30, 40

[56] References Cited

UNITED STATES PATENTS

| | | | |
|---|---|---|---|
| 2,634,743 | 4/1953 | Audemar | 137/512 |
| 2,859,763 | 11/1958 | Fites | 137/102 |
| 2,979,069 | 4/1961 | Valentine | 137/102 |
| 3,104,133 | 9/1963 | Valentine | 137/102 |
| 3,109,442 | 11/1963 | Horowitz | 303/29 |
| 3,183,919 | 5/1965 | Herring | 137/102 |
| 3,397,925 | 8/1968 | Dobrikin | 137/102 |
| 3,413,040 | 11/1968 | Horowitz | 137/102 |
| 3,862,782 | 1/1975 | Horowitz | 303/40 |
| 3,866,623 | 2/1975 | Klimek | 137/102 |

Primary Examiner—William R. Cline
Assistant Examiner—H. Jay Spiegel
Attorney, Agent, or Firm—Kinzer, Plyer, Dorn & McEachran

[57] ABSTRACT

A tractor protection valve for use in the air brake system of a tractor-trailer vehicle combination to protect and maintain the braking system of the tractor includes a housing having tractor supply and control ports, trailer supply and control ports, and a pair of exhaust ports. The housing has a chamber with the exhaust ports being positioned at opposite ends of the chamber. First and second spring-biased pistons are axially movable in the chamber to control communication between the ports.

11 Claims, 1 Drawing Figure

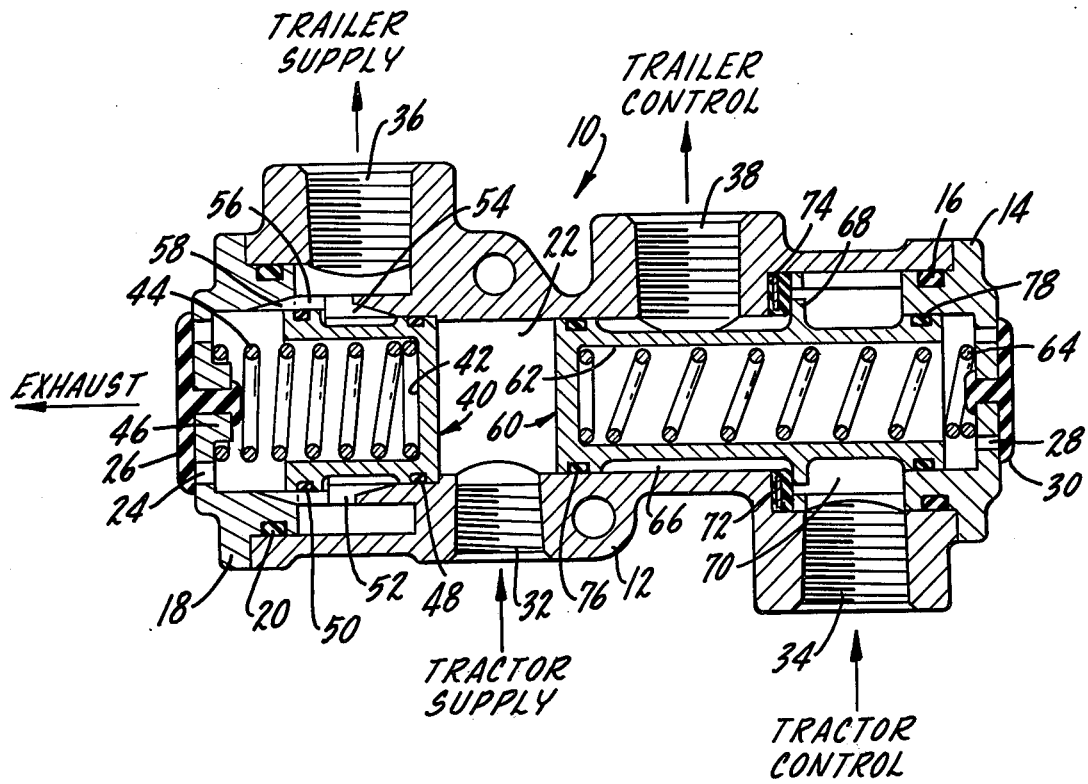

TRACTOR PROTECTION VALVE

SUMMARY OF THE INVENTION

The present invention relates to tractor protection valves for use in tractor-trailer vehicle combinations and has particular reference to a simply constructed reliably operable valve of the type described.

A primary purpose of the invention is a tractor protection valve for the use described having a pair of pistons movable within a single chamber in opposite directions in response to air pressure at an intermediate tractor supply port to control communication between all ports opening into the chamber.

Another purpose is a valve of the type described utilizing a pair of generally coaxial spring-biased pistons to control the valving functions.

Other purposes will appear in the ensuing specification, drawing and claims.

BRIEF DESCRIPTION OF THE DRAWINGS

The invention is illustrated diagrammatically in the attached cross section through the valve.

DESCRIPTION OF THE PREFERRED EMBODIMENT

A housing is indicated generally at 10 and includes a main body portion 12, a cap 14 mounting a seal 16 closing one end of the housing and a second cap 18 mounting a seal 20 closing the opposite end. A generally centrally located bore 22 extends from one end of the housing to the other. End cap 18 has a plurality of exhaust ports 24, the opening and closing of which is controlled by a resilient flapper valve 26. In like manner, end cap 14 has a plurality of exhaust ports 28, the opening and closing of which is controlled by resilient flapper valve 30.

The body portion 12 of the housing includes a tractor supply port 32 which will be connected to the tractor air supply line (emergency), a tractor control port 34 which will be connected to the tractor central line (service), a trailer supply port 36 which will supply pressure to the trailer brake system, and a trailer control port 38 which will supply air pressure control to the trailer service brake means.

A first piston 40 is movable in an axial direction within chamber 22 and has a hollow interior 42 seating a coil spring 44, the opposite end of which encircles a boss 46 formed in end cap 18 inside of exhaust ports 24. Piston 40 carries a first seal ring 48 in sealing engagement with the wall of chamber 22 and a second seal ring 50 also in engagement with the wall of chamber 22.

In radial alignment with port 36, there is a series of circumferentially arranged small ports 52 separated by dividers 54, the interior surface of which form a bearing support for seal ring 48 when piston 40 moves within chamber 22. In like manner there is a series of circumferentially arranged ports 56 separated by dividers 58 formed in end cap 18, with the interior surface of dividers 58 forming a bearing surface for seal 50.

Also positioned within chamber 22 is a second piston 60 having a hollow interior 62 containing a coil spring 64, one end of which is seated against end cap 14 inside of exhaust ports 28. The exterior of piston 60 includes an annular groove 66 which is positioned adjacent an outwardly-extending flange 68. A second annular groove 70 is formed on the opposite side of flange 68 from groove 66. A seal member 72 is contained within a recess 74 in body member 12 and is formed at least in part of a suitable sealing material to cooperate with flange 68 to control communication between ports 34 and 38. The structure of second piston 60 is completed by seal rings 76 and 78 positioned in grooves at opposite ends of the piston and bearing against the wall of chamber 22.

In operation, when the valve is in the position shown, trailer supply port 36 is connected through opening 56 to exhaust ports 24 and thus any air pressure in the trailer emergency supply system will be vented to exhasut. There is no communication between trailer control port 38 and tractor control port 34 as flange 68 is sealingly engaged with seal memer 72. Both springs 64 and 44 retain the respective pistons in the described position.

When air pressure at tractor supply port 32 has reached a certain level, for example 35 psi, piston 40 will begin to move toward the left, against the force of spring 44. Initial movement of the piston will cause seal 50 to move to a position closing communication between trailer supply port 36 and exhaust ports 24. Further movement of piston 40 in the same direction will open communication between trailer supply port 36 and tractor supply port 32, once seal 48 has moved a sufficient distance to open a path through ports 52.

As air pressure at the tractor supply port 32 increases, piston 60 will be moved against the force of spring 64 toward cap 14 and any air trapped within the piston will be vented through exhaust ports 28. Such movement of the piston moves flange 68 away from seal 72, opening communication between tractor control port 34 and trailer control port 38. Thus, pressure at a given level at tractor supply port 32 will cause the air pressure systems of the tractor and trailer to be connected together.

In the event of a loss of pressure on either the tractor or trailer side of the supply line, both pistons 40 and 60 will return, under the urging of their respective springs, to the position shown in the drawing. The control line between the tractor and trailer will be sealed and any air pressure in the trailer supply side of the system will be vented to atmosphere through exhaust ports 24, thereby applying the trailer spring brakes or the trailer relay emergency valve.

Of particular advantage in the invention is the simplified construction of the valve which provides reliable operation under all conditions. Exhaust ports are positioned at opposite ends of the chamber 22 with pistons 40 and 60 being axially movable within the chamber in direct alignment with the exhaust ports. The rate of springs 44 and 64 can easily be controlled to provide any desired regulation of the sequence of movement of the pistions and thus the desired communication between the various ports connected to the tractor protection valve.

Whereas the preferred form of the invention has been shown and described herein, it should be realized that there may be many modifications, substitutions and alterations thereto.

The embodiments of the invention in which an exclusive property or privilege is claimed are defined as follows:

1. A tractor protection valve including a housing having tractor supply and control ports, trailer supply and control ports and an exhaust port, a chamber in said housing with all of said ports opening into said chamber, a first piston movable in said chamber between said tractor supply and trailer supply ports, spring means urging said first piston to a position closing communication between said tractor supply and trailer supply ports and opening communication between said trailer supply and exhaust ports, a second piston movable in said chamber on the same axis as said first piston and between said tractor control and trailer control ports, spring means urging said second piston to a position closing communication between said tractor control and trailer control ports, said tractor supply port being positioned intermediate said first and second pistons with air pressure at said tractor supply port causing said first and second pistons to move in opposite directions in said chamber to open communication between said tractor control and trailer control ports and between said tractor supply and trailer supply ports.

2. The structure of claim 1 further characterized in that said second piston is hollow, said second piston spring means including a coil spring positioned within said hollow second piston.

3. The structure of claim 2 further characterized by and including a second exhaust port in said housing communicable with the inside of said second piston.

4. The structure of claim 1 further characterized by and including seal means carried by said housing, a valve seat surface carried by said second piston and cooperating with said seal means to close communication between said tractor control and trailer control ports in said one position of said second piston.

5. The structure of claim 4 further charcterized in that said valve seat surface is formed by an outwardly-extending flange on the exterior of said second piston.

6. The structure of claim 5 further characterized by and including an annular groove formed about the exterior of said second piston on one side of said flange, movement of said second piston against said spring means in response to air pressure at said tractor supply port causing said flange to move away from said seal means thereby placing said tractor control and trailer control ports in communication through said annular groove.

7. The structure of claim 1 further characterized by and including a second exhaust port in communication with said chamber, said exhaust ports being positioned at opposite ends of said chamber and generally axially aligned with the axis of movement of said first and second pistons.

8. The structure of claim 7 further characterized in that said first piston is hollow, said first piston spring means including a coil spring positioned within said hollow first piston and seated upon said housing generally coaxially with said exhaust ports.

9. The structure of claim 8 further characterized by and including spaced seal members positioned about the exterior of said first piston and in sealing engagement with said housing.

10. The structure of claim 9 further characterized in that one of said spaced seal members closes communication between said tractor supply and trailer supply ports.

11. The structure of claim 10 further characterized in that air pressure at said tractor supply port causes movement of said first piston, toward said exhaust port, with initial movement of said first piston causing the other of said first piston seal members to close communication between said trailer supply and exhaust ports, with further movement of said first piston moving one other seal member to a position opening communication between said tractor supply and trailer supply ports.

* * * * *